United States Patent [19]

Koenraadt et al.

[11] Patent Number: 6,015,864
[45] Date of Patent: Jan. 18, 2000

[54] THERMOSETTING POWDER COATING COMPOSITION

[75] Inventors: Martinus Adrianus Anthonius Maria Koenraadt, Duiven; Arie Noomen, Voorhout; Keimpe Jan Van Den Berg, Sassenheim; Josephus Christiaan Van Oorschot, Arnhem; Huig Klinkenberg, Katwijk aan Zee, all of Netherlands

[73] Assignee: Akzo Nobel NV, Arnhem, Netherlands

[21] Appl. No.: 09/083,074

[22] Filed: May 21, 1998

Related U.S. Application Data

[63] Continuation of application No. PCT/EP96/05026, Nov. 12, 1996.

[51] Int. Cl.$^7$ ................................................... C08C 19/30
[52] U.S. Cl. ........................ 525/385; 525/327.2; 525/438; 525/453
[58] Field of Search ................................. 525/385, 327.2, 525/438, 453

[56] References Cited

U.S. PATENT DOCUMENTS

| | | | |
|---|---|---|---|
| 3,408,421 | 10/1968 | Kurka | 260/830 |
| 3,449,340 | 6/1969 | Orth et al. | 260/248 |
| 4,147,737 | 4/1979 | Sein et al. | 260/835 |

OTHER PUBLICATIONS

*Lackkunstharz*, H.Wagner and H.F.Sarx, 5$^{th}$ Ed., München, Carl Hanser Verlag, 1971, pp. 86–90 and 94–96.
Cyclic Ethers Made by Pyrolysis of Carbonate Esters, J.Am. Chem.Soc., D.B. Patterson, 79 (1957), pp. 3455–3456.
International Search Report PCT/EP 96/05026 dated Feb. 11, 1997.
H. Lee & K. Nevill, *Handbook of Epoxy Resins*, McGraw–Hill pp. 1–1, 1–2 1967.

*Primary Examiner*—Robert Dawson
*Assistant Examiner*—D. Aylward
*Attorney, Agent, or Firm*—Joan M. McGillycuddy

[57] ABSTRACT

Proposed is a thermosetting powder coating composition comprising a mixture of particles reactive towards one another, optionally in combination with a catalyst, with a portion of the reactive particles comprising a polymer reactive towards oxetane groups while another portion comprises an oxetane groups-containing cross-linking agent having an oxetane functionality of more than 1. The quantity of oxetane oxygen in the cross-linking agent preferably is at least 0.4 wt. %. The reactive polymer preferably is a polymer having groups reactive towards oxetane, such as carboxyl, epoxy, oxetane, anhydride, and hydroxyl, with preference being given to a polyester or a hydroxypolyacrylate.

15 Claims, No Drawings

THERMOSETTING POWDER COATING COMPOSITION

The present application is a Continuation of International Application No. PCT/EP96/05026 filed Nov. 12, 1996.

BACKGROUND OF THE INVENTION

1. Field of the Invention

The invention pertains to a thermosetting powder coating composition, optionally in combination with a catalyst.

2. Related Art

Thermosetting powder coating compositions are generally known.

Most powder coatings are based at least in part on the use of an epoxy resin as cross-linking agent. For an example of this reference is made to U.S. Pat. No. 4,147,737. The binder described in said document comprises a mixture composed of 4–25 wt. % of a polyepoxide resin, the molecules of which contain an average of at least two epoxy groups, and 75–96 wt. % of a solid modified polyester resin having an acid number of from 30 to 100 and softening in the range of 60° to 130° C. The epoxy resin preferably employed is triglycidyl isocyanurate (TGIC). In addition, the powder coating may contain a catalyst and, if so desired, an extra cross-linking agent.

A drawback to the known powder coatings is that the substance employed as cross-linking agent, triglycidyl isocyanurate (TGIC), is toxicologically suspect.

SUMMARY OF THE INVENTION

The invention now provides a thermosetting powder coating composition containing a cross-linking agent which exhibits no, or hardly any, toxicity or matuagenicity.

The invention consists in that a thermosetting powder coating composition of the known type mentioned in the opening paragraph comprises a polymer reactive towards oxetane groups and an oxetane groups-containing cross-linking agent having an oxetane functionality of more than 1.

DETAILED DESCRIPTION OF THE INVENTION

It should be noted that the use of oxetane groups-containing compounds in coatings has earlier been proposed in U.S. Pat. No. 3,449,340. In this patent publication the emphasis is on the use of polyoxetanes which are either self-curing under the influence of preferably cationic polymerisation, or are cured with the aid of a cross-linking agent reactive towards oxetane groups. They are recommended in particular for use as textile auxiliaries, as bonding agents for pigment dyeings and pigment prints on textile materials, as dyeing assistants, and as coating agents for textiles, leather, and paper. There is not the least suggestion concerning the use of an oxetane groups-containing compound as a cross-linking agent in powder coatings, nor, given the lengthy curing times employed in Examples 6 through 10, can the polyoxetanes described in said document be said to constitute an invitation to the skilled person to use them in powder coatings.

The quantity of cross-linking agent, calculated on the combination of polymer reactive towards oxetane groups and cross-linking agent, generally will not exceed 70 wt. %. The minimum quantity of cross-linking agent to be incorporated generally is more than 5 wt. %. Preference is given in this case to a quantity of from 10 to 30 wt. %.

The quantity of oxetane oxygen in the cross-linking agent generally corresponds to a quantity of at least 0.4 wt. %, with a quantity of oxetane oxygen of more than 1 wt. % being preferred. Optimum results are commonly obtained using more than 2 wt. % of oxetane oxygen in the cross-linking agent. As a rule, the quantity of oxetane oxygen will not exceed 20 wt. %.

The oxetane groups-containing cross-linking agent can be obtained by converting an oxetane oxygen-containing monomer having a structural formula which satisfies the following formula:

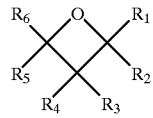

wherein $R_1$, $R_2$, $R_3$, $R_4$, $R_5$, and $R_6$ may be the same or different and have the meaning of a hydrogen atom or a branched or linear alkyl group having 1 to 10 carbon atoms, with the proviso that one of the R-groups represents a nucleophilic group or electrophilic group connected to the oxetane ring either directly or via a branched or linear alkylene group containing not more than 10 carbon atoms, the nucleophilic group being selected from, e.g., HO—, HS— or the group RHN—, wherein R has the meaning of a hydrogen atom or an alk(en)yl group having 1 to 10 carbon atoms, and the electrophilic group being selected from a halide such as Cl⁻ of Br⁻, or a tosylate or sulphonate group.

Compounds according to the above formula can be prepared using a process such as described by D. B. Pattison in J. Am. Chem. Soc. 79 (1957), 3455–3456, which comprises the ester interchange of a hydroxyfunctional 1,3-diol with diethyl carbonate to form the corresponding cyclic carbonate with ethanol going out. On further heating carbon dioxide escapes to form the oxetane group-containing alcohol. The procedure commonly is as follows. In a first step the polyol is condensed with the alkyl carbonate at a temperature between 90° and 150° C. and a pressure between $10^3$ and $10^5$ Pa in the presence of sodium hydroxide as initiator, followed by heating in a second step to between 90° and 200° C. at a pressure between $10^2$ and $10^5$ Pa, with carbon dioxide escaping and the desired product being obtained. Examples of suitable hydroxyfunctional oxetanes which can be prepared in this way are 3-methyl-3-hydroxymethyl oxetane, 3-ethyl-3-hydroxymethyl oxetane, and 3,3-oxetane dimethanol. The hydroxyl group of the resulting oxetane can be replaced by other reactive groups if so desired, e.g., by halogen (chlorine, bromine or iodine), tosylate or certain sulphonate esters. Substituting a particular reactive group, e.g., a chloride, for another reactive group opens up the possibility of entering into a reaction with a group other than one reactive towards a hydroxyl group. For example, mention may be made of the reaction of a chloride-functional oxetane with a compound containing phenolic hydroxyl groups, such as is present in hydroquinone or bisphenol A.

For the preparation of the cross-linking agents to be employed according to the invention preferably use is made of a hydroxyfunctional oxetane and an at least difunctional compound containing groups reactive towards hydroxyl groups. Several at least difunctional compounds qualify for entering into a reaction with the hydroxyfunctional oxetane. For instance, the hydroxyfunctional oxetane can be condensed with a dibromine alkane or a dichlorine alkane to form a dioxetane suitable for direct use as a cross-linking agent. Nucleophilic replacement of an allyl halide or a vinylbenzyl halide by condensation with a hydroxyfunctional oxetane results in oxetanes containing ethylenically unsaturated groups. Further condensation of these two key compounds with a silane having Si—H bonds results in silicon-containing (multifunctional) oxetane monomers. However, preference is given to a powder coating composition in which a portion of the reactive particles is obtained by reacting a hydroxyfunctional oxetane with a polyisocyanate. The molecular weight (Mn) of the oxetane groups-containing cross-linking agent is in the range of 200 to 7000, more particularly, in the range of 300 to 2000. Low-molecular weight cross-linking agents are obtained by reacting a hydroxyoxetane with aliphatic, cycloaliphatic, and/or aromatic di-, tri- or tetraisocyanates which may be ethylenically unsaturated or not, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω'-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexyl-methane-4,4'-diisocyanate, a toluene diisocyanate, 1,3-bis(isocyanatomethyl)benzene, a xylene diisocyanate, 1,5-dimethyl-2,4-bis(isocyanatomethyl) benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, e.g., hexamethylene diisocyanate or isophorone diisocyanate, to a diol such as ethylene glycol, the adduct of 3 molecules of hexamethylene diisocyanate to 1 molecule of water (available from Bayer under the trademark Desmodur N), the adduct of 1 molecule of trimethylol propane to 3 molecules of toluene diisocyanate (available from Bayer under the trademark Desmodur L), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. Preferably, an aliphatic or cycloaliphatic di- or triisocyanate having 8–36 carbon atoms or an isocyanurate of the diisocyanates mentioned above is employed.

Di- or polyisocyanates having a higher molecular weight can be obtained by reacting a lower-molecular weight polyisocyanate with a hydroxyfunctional or aminofunctional compound. Suitable aminofunctional compounds include aliphatic or cycloaliphatic amines having at least 1, and preferably 2 to 4, primary amino groups. Examples of suitable amino compounds include ethylene diamine, propylene diamine, ethanolamine, propanolamine, butylene diamine, pentamethylene diamine, hexamethylene diamine, decamethylene diamine, 4,7-dioxadecane-1,10-diamine, dodecamethylene diamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminocyclohexyl methane, isophorone diamine, bis-(3-methyl-4-aminocyclohexyl)methane, 2,2-bis-(4-aminocyclohexyl)propane, nitrile tri(ethane amine), polyether polyamines, e.g., those known under the trademark Jeffamine® ex Huntsman, bis-(3-aminopropyl) methylamine, 3-amino-1-(methylamino)propane, 3-amino-1-(cyclohexylamino)propane, N-(2-hydroxyethyl)ethylene diamine, and polyamines of the formula $H_2N—(R_2—NH)_n—R_1—NH_2$, wherein the group $R_1$ and the n groups $R_2$, which may be the same or different, represent an alkylene group having 2–6, preferably 2–4, carbon atoms, and n is a number of 1–6, preferably 1–3. In this connection alkylene group also stands for a cycloalkylene group or an alkylene group having an ether-oxygen atom. Typical polyalkylene polyamines include diethylene triamine, dipropylene triamine, and dibutylene triamine. The amino compound preferably has a cycloaliphatic nature and possesses 5–15 carbon atoms, such as isophorone diamine, 4,4'-dicyclohexyl methane diamine, and 3,3'-dimethyl-4,4'-dicyclohexyl methane diamine.

Suitable hydroxyfunctional compounds include aliphatic or cycloaliphatic polyols having at least 1, preferably 2 to 4, hydroxyl groups. Examples of suitable hydroxyl compounds are ethylene glycol, propylene glycol, diethylene glycol, tetramethylene diol, neopentyl glycol, hexamethylene diol, cyclohexane diol, bis-(4-hydroxycyclohexyl)methane, glycerol, trimethylol ethane, trimethylol propane, tri(2-hydroxyethyl)isocyanurate, and pentaerythritol. Suitable hydroxyfunctional polyols and other suitable hydroxyl compounds, such as polyester diols and polyester polyols and polyether diols and polyether polyols, have been disclosed, int. al., in H. Wagner and H. F. Sarx, Lackkunstharze, 5th ed. (München: Carl Hanser Verlag, 1971).

Suitable hydroxyfunctional polyesters have a hydroxyl number of from 5 to 200 mg KOH/g, an acid number <10 mg KOH/g, and an average functionality of at least 2. The polyesters can be crystalline, but amorphous polyesters are preferred. Mixtures of amorphous and crystalline polyesters also qualify for use. They can be obtained in the conventional way, by esterification or transesterification, optionally in the presence of a catalyst, such as dibutyl tin oxide or tetrabutyl titanate, polycarboxylic acids, such as adipic acid, sebacic acid, phthalic acid, isophthalic acid, terephthalic acid, pyromellitic acid, trimellitic acid, 3,6-dichlorophthalic acid, tetrachlorophthalic acid, or their anhydrides or ester forming equivalents with aliphatic diols, such as ethylene glycol, propane-1,2-diol, butane-1,2-diol, butane-1,4-diol, butane-1,3-diol, 2,2-dimethylpropane diol-1,3 (neopentylglycol), hexane-2,5-diol, hexane-1,6-diol, 1,4-dimethylol cyclohexane, 2,2-[bis-(4-hydrocyclohexyl)]-propane, diethylene glycol, dipropylene glycol, and 2,2-bis-[4-(2-hydroxyethoxy)]-phenyl propane, as well as smaller quantities of polyols, such as glycerol, hexane triol, sorbitol, pentaerythritol, trimethylol propane, and tri(2-hydroxyethyl)isocyanurate. In addition, fatty acids from linseed oil and soybean oil can be included.

Suitable polyol polyurethanes are derived from one or more of the aforementioned aliphatic, cycloaliphatic or aromatic di-, tri- or tetraisocyanates which may be ethylenically unsaturated or not and from one or more of the aforementioned hydroxyl compounds. Other polyhydroxyl compounds suitable for conversion with a polyisocyanate into a polyurethane having free isocyanate groups are derived from polyhydroxyalkyl(meth)acrylate, e.g., polyhydroxyethyl(meth)acrylate and polyhydroxypropyl (meth)acrylate. Suitable methacrylate polyols are supplied by Goldschmidt (Germany). These (meth)acrylate polymers can also include comonomers such as styrene, ethene, propene, allyl, and acrylonitrile.

The preparation of polyolurethanes having isocyanate terminated groups generally proceeds as follows. The molar equivalency ratio of the number of hydroxyl groups to the number of isocyanate groups is usually selected in the range of 0.1:1 to 2:1 at a reaction temperature of from 30° to 200° C., preferably of from 60° to 150° C., and a reaction time between 5 minutes and 10 hours, preferably between 30 minutes and 5 hours. The reaction is commonly carried out in the presence of a solvent such as xylene, toluene, tetrahydrofuran, and butyl acetate.

The preparation of the cross-linking agent by reacting the hydroxyoxetane with the polyisocyanate proceeds analogously.

The cross-linking agents used in powder coating compositions according to the invention can also be obtained by transesterifying a polyalkyl ester with a hydroxyfunctional oxetane. Suitable polyalkyl esters can be obtained by the nucleophilic addition of carbanions to $\alpha,\beta$-unsaturated carbonyl compounds. Also suitable are alkyl ester terminated polyesters derived from any one of the aforementioned polycarboxylic acids, polyols, and/or ester forming equivalents thereof. A further example to be mentioned is the conversion of diethyl fumarate and diethyl malonate into the tetraethyl ester of 1,1,2,3-propane tetracarboxylic acid. Transesterification with a hydroxyfunctional oxetane will then give an oxetane-functional cross-linking agent.

Alternatively, an oxetane-functional cross-linking agent can be obtained by transetherification of a hydroxyfunctional oxetane with aminoformaldehyde groups-containing compounds, e.g., a urea resin or melamine resin.

A wide range of polymers having groups reactive towards oxetane groups is eligible for use in the thermosetting powder coating compositions according to the invention. Suitable polymers can contain, int. al., carboxyl, epoxy, oxetane, hydroxyl, carboxylic anhydride, phosphoric acid, phosphorous acid, and/or thiol groups. Preference is given in this connection to polymers having free hydroxyl, carboxylic anhydride, oxetane, or carboxyl groups. The polymer in that case can be a polyester, a poly(meth)acrylate, a polyether, a polyurethane, a polycarbonate, a trifluoroethylene copolymer, a polybutadiene, a polystyrene, or a styrene-maleic anhydride copolymer, with preference being given to polyesters and polyacrylates.

The number average molecular weight (Mn) generally is in the range of 800 to 10,000, preferably in the range of 1500 to 7000. At such a molecular weight the flow range generally is between 100° and 200° C. The glass transition temperature is commonly selected in the range of 20° to 120° C., but usually is higher than 30° C., preferably higher than 60° C.

Suitable carboxyl-functional polyesters have an acid number of from 5 to 70 mg KOH/g, a glass transition temperature between 30° and 90° C., and a hydroxyl number in the range of 0 to 10 mg KOH/g. The carboxyl-functional polyesters can be obtained in the conventional manner by converting an essentially aromatic polycarboxylic acid or ester forming equivalent thereof with an aliphatic or cycloaliphatic diol or ester forming equivalent thereof. Examples of suitable aromatic polycarboxylic acids are phthalic acid, isophthalic acid, terephthalic acid, pyromellitic acid, trimellitic acid, 3,6-dichlorophthalic acid, and tetrachlorophthalic acid. Preference is given in this case to a polyester 50, preferably 70, mole % of the acid component of which is made up of isophthalic acid and/or terephthalic acid. In addition, other polycarboxylic acids can be present, such as tetrahydrophthalic acid, hexahydrophthalic acid, malonic acid, hexahydroendomethylene tetrahydrophthalic acid, azelaic acid, sebacic acid, decanedicarboxylic acid, dimeric fatty acid, adipic acid, succinic acid, and maleic acid in an amount of not more than 30, preferably 20, mole % of the overall amount of carboxylic acid. Hydroxycarboxylic acids and/or lactones can also be incorporated into the polyesters. As examples may be mentioned 12-hydroxystearic acid, $\epsilon$-caprolactone, and the hydroxypivalic acid ester of neopentyl glycol. In addition, small quantities of a monocarboxylic acid may be present, such as benzoic acid, tert. butyl benzoic acid, hexahydrobenzoic acid, and saturated aliphatic monocarboxylic acids.

The diol component is essentially made up of aliphatic diols such as ethylene glycol, propane-1,2-diol, propane-1,3-diol, butane-1,2-diol, butane-1,4-diol, butane-1,3-diol, 2,2-dimethyl propane diol-1,3 (neopentyl glycol), hexane-2,5-diol, hexane-1,6-diol, diethylene glycol, 2,2-[bis(4-hydrocyclohexyl)]propane, 1,4-dimethylol cyclohexane, dipropylene glycol, and 2,2-bis[4-(2-hydroxyethoxy)] phenyl propane, as well as, optionally, small quantities of polyols having a functionality >2, such as glycerol, hexane triol, pentaerythritol, sorbitol, trimethylol propane, and tri (2-hydroxyethyl)isocyanurate. Instead of polyols, it is possible to employ epoxy compounds. The alcohol component preferably contains at least 50 mole % of neopentyl glycol. Also, compounds containing amino groups can be incorporated into the polyesters. As examples may be mentioned hexane-1,6-diamine, butane-1,4-diamine, and $\epsilon$-caprolactam. The amino group-containing compound can replace at least part of the polyols. The amide groups-containing polyester obtained in this manner has an increased Tg and powder coating compositions containing said polyester have improved spraying properties.

After preparation of the carboxyl-functional polyester at a temperature of about 240° C. and cooling to a temperature of about 190–200° C. it is possible to add a curing catalyst, which may be in the form of a masterbatch optionally including other additives, or not. Alternatively, the catalyst can be added as the polyester is mixed with the cross-linking agent in an extruder, simultaneously with pigments and fillers.

As for the polyacrylates eligible for use in the present powder coatings as reactive polymer, particular preference is given to a polyacrylate having a hydroxyl number in the range of 0 to 10 mg KOH/g, an acid number of from 5 to 70 mg KOH/g, and a Tg between 30° and 90° C.

The catalysts and curing agents eligible for use according to the invention are identical with those used for curing epoxy resins with acid, epoxy-epoxy, and epoxy with anhydride. They commonly contain tertiary amino groups, basic nucleophilic groups, quaternary ammonium salts, or phosphonium salts.

It should be noted that the oxetane (1,3-epoxy) groups in the cross-linking agents of the present powder coating compositions are among the least reactive epoxy groups. For that reason it is of the essence to add sufficient catalyst to obtain a coating which cures sufficiently rapidly.

Examples of suitable classes of catalysts are N-dialkylamine pyridines, tertiary amines, imidazole derivatives, guanidines, and cyclic amino compounds. If so desired, the catalysts can be blocked. Specific examples of suitable catalysts are N-dimethylaminopyridine, benzotriazole, triethylamine, triphenyl amine, 4,5-diphenyl imidazole, 1-ethyl imidazole, 2-methyl imidazole, 4-methyl imidazole, tetramethyl guanidine, 1,5-diazabicyclo[4,3,0,] non-5-ene, and 1,5,7-triazabicyclo[4,4,0,]dec-5-ene. Other catalysts comprise quaternary ammonium salts, such as tetramethyl ammonium bromide, trimethyl benzyl ammonium hydroxide, trimethyl benzyl ammonium methoxide, phenyl trimethyl ammonium chloride, phenyl trimethyl ammonium bromide, phosphonium salts, such as allyl triphenyl phosphonium chloride, benzyl triphenyl phosphonium chloride, bromomethyl triphenyl phosphonium bromide, and lithium salts. Suitable lithium salts include lithium alcoholates such as lithium butylate. According to the invention, preference is given to the use of a phosphonium salt as catalyst.

For the reaction of oxetanes with a carboxylic anhydride use can be made of a nitrogenous catalyst of the aforementioned type. For reacting oxetane groups with compounds having a hydroxyl functionality a strong Lewis acid can be employed. In addition, an extra curing agent can be used, e.g., a carboxylic anhydride. For reacting one oxetane group with another oxetane group use can be made of a strong Lewis acid, with an additional curing agent usually providing superior results. The curing agents which can be used in addition to the oxetane groups-containing curing agents belong to the group of polyanhydrides, hydrazides, and/or polyphenols. The amount of catalyst generally ranges from 0.01 to 5 wt. %, calculated on the amount of binder.

Of course, the present powder coating compositions may also contain the usual pigments, fillers, levelling agents, and stabilisers. Suitable pigments include inorganic pigments such as titanium dioxide, zinc sulphide, iron oxide, and chromium oxide, as well as organic pigments such as azo compounds. Examples of suitable fillers are metal oxides, silicates, carbonates, and sulphates.

Further, the powder coating compositions can include stabilisers, such as primary and secondary anti-oxidants, and UV-stabilisers, such as quinones, sterically hindered phenols, phosphonites, phosphates, thio-ethers, and HALS compounds. To obtain powder coatings of proper stability during curing, primary anti-oxidants are added in an amount corresponding to 0.1 to 2 wt. % of the binder composition.

Examples of degassing media suitable for use are benzoin and cyclohexane dimethanol dibenzoate. Examples of levelling agents are polyalkyl acrylates, fluorocarbon compounds, and silicone oil. Other additives comprise those used to optimise spraying conditions, such as sterically hindered tertiary amines. The carboxyl-functional binder can be mixed with the oxetane groups-containing cross-linking agent, the pigments, and other additives in an extruder at a temperature in the range of 90° to 130° C. and cured after electrostatic deposition at a temperature in the range of 140 to 250° C. under the influence of the conventional catalyst. During the curing process the powder will melt and then flow across the substrate to be coated to form an even, connected film.

If so desired, the present coating composition can contain still other conventional powder coating composition constituents, such as epoxy groups-containing compounds, including the diglycidyl ethers of bisphenol A. The powder coating compositions according to the invention can be applied either in the dry state or from an aqueous suspension onto a wide range of substrates, such as synthetic materials, wood, metal, and glass. The invention will be further elucidated with reference to the following examples, which, of course, are submitted for a better understanding of the invention and are not to be construed as limiting in any manner whatsoever.

EXAMPLE I
Preparation of 3-ethyl-3-hydroxymethyl oxetane (EHMO)

In a 1-liter three-necked flask equipped with a stirrer, a thermometer, and a reflux condenser were provided beforehand 268 g (6.0 molar equivalents) of trimethylol propane, 236 g (4.0 molar equivalents) of diethyl carbonate, and 0.10 g of sodium hydroxide. The mixture was heated with refluxing until the temperature dropped to 100° C. Next, the apparatus was equipped with a Vigreaux distillation column, a condenser, and a receiving column. The reaction mixture was then distilled with a head temperature of 76–78° C. being maintained. The distillation process was continued until the temperature in the reaction mixture was 145° C. The pressure was then reduced gradually to 15 mbar, with the temperature in the reaction mixture being kept in the range of 140° to 150° C. On heating to above 180° C. carbon dioxide escaped, after which the material for the most part came through at a reaction mixture temperature of 190–210° C. and a head temperature of 90–140° C. at a pressure of 50–90 mbar. NMR measurements confirmed that the main fraction was composed of a liquid corresponding to the title formula (boiling point 114–115° C. at 16 mbar). The yield was 76%.

EXAMPLE II
Preparation of a cross-linking agent based on EHMO and an isocyanate-containing compound A mixture composed of 366 g (1.5 molar equivalents) of the trimer of isophorone diisocyanate (Vestanat® IPDI-T1890/100% ex Hüls), 225 g of butyl acetate, and 0.75 g of dibutyl tin dilaurate was heated to 70° C. Next, 174 g (1.5 molar equivalents) of 3-ethyl-3-hydroxymethyl oxetane of Example I were added dropwise to the reaction mixture over a period of 1 hour. The temperature was then kept at 70° C. for a further hour.

After 1 hour infra-red spectroscopy failed to show any further isocyanate. The organic solvent was distilled off under reduced pressure. The product was a clear solid which melted at about 125° C.

EXAMPLE III
Preparation of a carboxyl-functional polyester

In a 2-liter reaction vessel equipped with a stirrer, a thermometer, and a distilling unit were provided beforehand 800 g (9,6 molar equivalents) of terephthalic acid, 534 g (10.2 molar equivalents) of neopentyl glycol, 16 g (0.36 molar equivalent) of trimethylol propane, and 1,5 g of dibutyl tin oxide. With stirring and passing of nitrogen the temperature was slowly raised to 240° C., with water being discharged. The reaction was continued until the polyester had an acid number <10 mg KOH/g. Next, in a second step, 150 g (1.8 molar equivalents) of isophthalic acid were added, after which the esterification process was continued until a polymer having an acid number of 40 mg KOH/g was obtained.

The resulting resin had the following properties:

| acid number | 39,5 mg KOH/g |
| --- | --- |
| functionality | 2,25 |
| Tg | 69° C. |

EXAMPLE IV
Preparation of a powder coating composition based on a carboxyl-functional polyester and a cross-linking agent according to Example II In an extruder 480 g of the polyester having carboxyl terminated groups of Example III and 120 g of the cross-linking agent of Example II were mixed at a temperature of 110° C. with 400 g of titanium dioxide (CL310 ex Kronos), 7 g of polyacrylate as levelling agent (Resiflow PV 88 ex Worlée), and 5 g of benzoin. After cooling the extrudate was reduced to a powder and sieved on a sieve with a mesh size of 80 μm. The Tg of yje powder was 590° C. The powder was cured for 10 minutes at 2000° C., giving an even coating layer.

EXAMPLE V
Preparation of tetra-ester of diethyl malonate and diethyl maleate Into a 1-liter three-necked flask equipped with a stirrer, a thermometer, and a reflux condenser was weighed a mixture of 240.3 g (3.0 molar equivalents) of diethyl malonate, 15.2 g of benzyl trimethyl ammonium hydroxide (40% in methanol), and 100 ml of ethanol. The mixture was heated with refluxing, after which 215.3 g (2.5 molar equivalents) of diethyl maleate were added. The mixture was heated with refluxing until no further unsaturation could be detected by NMR. Following cooling to ambient temperature the mixture's treatment was continued by washing with water, extraction with ether, washing with 3% HCl and with saturated NaCl solution. The ether was distilled off in vacuo. The remaining liquid was distilled in a Vigreaux column, the result being a clear liquid having a boiling point of 196° C.–200° C. at 14 mbar. NMR analysis showed the product to be very pure.

EXAMPLE VI
Preparation of an oxetane-functional cross-linking agent

In a 500 ml three-necked flask equipped with a stirrer, a thermometer, and a reflux condenser a mixture of 91.4 g (1.1 molar equivalents) of tetra-ester of Example V, 116 g (1.0 molar equivalent) of 3-ethyl-3-hydroxymethyl oxetane (EHMO of Example I), and 0.21 g of dibutyl tin oxide was provided beforehand. The flask was heated to 180° C., with about 75% of theory of the ethanol being distilled off.

After 2 hours the flask was cooled down and analysed using NMR. The result was a colourless, clear liquid.

EXAMPLE VII
Preparation of a powder coating composition based on a carboxyl-functional polyester and the cross-linking agent of Example VI In an extruder 480 g of a polyester having carboxyl terminated groups (Uralac P2220 ex DSM Resins) with an acid number of 52 mg KOH/g, 120 g of a cross-linking agent according to Example VI, and 15 g of ethyl triphenyl phosphonium bromide were mixed at 110° C. with 7 g of polyacrylate as levelling agent (Resiflow PV 88 ex Worlée) and 5 g of benzoin. After cooling the extrudate was pulverised and sieved on a sieve having a mesh size of 80 μm. The Tg of the powder was 50° C. The powder was cured for 10 minutes at 200° C. The impact resistance of a 50 μm thick coating layer was >80 kg.cm.

EXAMPLE VIII
Preparation of a cross-linking agent having an oxetane functionality of 2

To a solution of 348 g (3.0 molar equivalents) of 3-ethyl-3-hydroxymethyl oxetane of Example I, 300 g (2.0 molar equivalents) of 1,4-dibromodecane, and 50 g of a 50 wt. % aqueous KOH solution were added, with vigorous stirring at 0° C., 10.0 g of tetra-n-butyl ammonium bromide. After 24 hours 100 ml of ether and 100 ml of water were added to the reaction mixture. The organic phase was washed twice with water, dried on magnesium sulphate, and filtered, after which the solvent was removed with a rotating vacuum evaporator. The residue was purified by flash column chromatography (silica gel with a 1:1 ethyl acetate/hexane mixture), resulting in the dioxetane: 3,3'-(1,10-decanediyl di(oxymethylene)di-(3-ethyl oxetane). NMR analysis showed the product to be pure. The yield was about 50%.

EXAMPLE IX
Mutagenesis test

In the example below the mutagenicity of a cross-linking agent based on oxetane is compared with the mutagenicity of TGIC. The following guidelines were adhered to in the comparison:

Organisation for Economic Co-operation and Development (OECD), directive 471: "Genetic Toxicology: *Salmonella typhimurium* Reverse Mutation Assay," (adopted May 26, 1983), European Economic Community (EEC), Directive 92/69/EEC. Annex V of the EEC Directive 67/548/EEC, Part B: Methods for the Determination of Toxicity; B.14: "Other Effects—Mutagenicity: *Salmonella typhimurium*—Reverse Mutation Assay." EEC Publication no. L383 (adopted December 1992).

Studies of a certain type of Salmonella carried out in accordance with these guidelines clearly showed that, unlike TGIC, the cross-linking agent of Example II does not have any mutagenic properties.

We claim:

1. A thermosetting powder coating composition comprising a
    polymer reactive towards oxetane groups and an oxetane groups-containing cross-linking agent having an oxetane functionality of more than 1, wherein said oxetane groups-containing cross-linking agent is obtained by reacting a functional group-containing oxetane with a compound having at least two groups reactive towards said functional group.

2. A thermosetting powder coating composition comprising a polymer reactive towards oxetane groups and an oxetane groups-containing cross-linking agent having an oxetane functionality of more than 1, wherein the quantity of oxetane oxygen in the cross-linking agent is at least 0.4%.

3. The powder coating composition of claim 1 wherein the functional group is a nucleophilic group selected from HO—, HS— or RHN—, wherein R has the meaning of a hydrogen atom or an alk(en)yl group having 1 to 10 carbon atoms, with the nucleophilic group being connected to the oxetane group either directly or via a branched or linear alkylene group containing not more than 10 carbon atoms.

4. The powder coating composition of claim 1 wherein the functional group is an electrophilic group selected from $Cl^-$, $Br^-$ tosylate or sulphonate, with the electrophilic group being connected to the oxetane group either directly or via a branched or linear alkylene group containing not more than 10 carbon atoms.

5. The powder coating composition of claim 3 wherein the oxetane groups-containing cross-linking agent is obtained by reaction of an HO-group containing oxetane with a polyisocyanate.

6. The powder coating composition of claim 5, wherein the polyisocyanate is the reaction product of a hydroxyfunctional compound and a low-molecular weight polyisocyanate.

7. The powder coating composition of claim 1 wherein the groups in the polymer reactive towards oxetane belong to the group of carboxyl, epoxy, oxetane, anhydride and/or hydroxyl.

8. The powder coating composition of claim 1 wherein the reactive polymer is a polymer selected from the group of hydroxyl, carboxyl, carboxylic anhydride and/or oxetane groups-containing polyesters, polyacrylates and/or polyurethanes.

9. The powder coating composition of claim 1 wherein the glass transition temperature Tg of the reactive polymer is between 20° and 120° C.

10. The powder coating composition of claim 8 wherein the reactive polymer is a polyester having an acid number of from 5 and 70 mg KOH/g, a hydroxyl number of from 0 to 10 mg KOH/g, and a Tg between 30° and 90° C.

11. A thermosetting powder coating composition comprising a polymer reactive towards oxetane groups and an oxetane groups-containing cross-linking agent having an oxetane functionality of more than 1, wherein the reactive polymer is a polyacrylate having a hydroxyl number between 0 and 10 mg KOH/g, an acid number between 5 and 70 mg KOH/g, and a Tg between 30° and 90° C.

12. The powder coating composition of claim 1 wherein the molecular weight (Mn) of the reactive polymer is in the range of 800 to 10,000.

13. The powder coating composition of claim 12 wherein the molecular weight (Mn) of the reactive polymer is in the range of 1500 to 7000.

14. A thermosetting powder coating composition comprising a polymer reactive towards oxetane groups and an oxetane groups-containing cross-linking agent having an oxetane functionality of more than 1, wherein the molecular weight (Mn) of the oxetane groups-containing cross-linking agent is in the range of 200 to 7000.

15. The thermosetting powder coating composition of claim 1 wherein said composition includes a catalyst.

\* \* \* \* \*